United States Patent
Ichikawa et al.

(10) Patent No.: US 7,009,758 B2
(45) Date of Patent: Mar. 7, 2006

(54) LIGHT CONTROL ELEMENT

(75) Inventors: Junichiro Ichikawa, Tokyo (JP); Futoshi Yamamoto, Tokyo (JP); Takashi Shinriki, Tokyo (JP); Yoshihiro Hashimoto, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 57 days.

(21) Appl. No.: 10/809,053

(22) Filed: Mar. 25, 2004

(65) Prior Publication Data
US 2004/0252365 A1   Dec. 16, 2004

(30) Foreign Application Priority Data
Mar. 31, 2003   (JP) .............................. 2003-095658

(51) Int. Cl.
*G02F 1/00*   (2006.01)
(52) U.S. Cl. ....................................... 359/321; 359/322
(58) Field of Classification Search ............... 359/321, 359/322, 323; 385/2, 8; 372/102, 12
See application file for complete search history.

(56) References Cited

U.S. PATENT DOCUMENTS

| | | | |
|---|---|---|---|
| 6,198,855 B1 * | 3/2001 | Hallemeier et al. | 385/2 |
| RE37,809 E * | 7/2002 | Deacon et al. | 372/102 |
| 6,654,512 B1 * | 11/2003 | Burns et al. | 385/2 |
| 2003/0133638 A1 * | 7/2003 | Jin et al. | 385/2 |

* cited by examiner

Primary Examiner—Scott J. Sugarman
Assistant Examiner—Richard Hanig
(74) Attorney, Agent, or Firm—Chapman and Cutler LLP

(57) ABSTRACT

The present invention intends to control DC drift phenomenon in a light control element having ridge structure, and to provide a light control element with high drive stability in a large area. The present invention has character that, in a light control element being equipped with a base plate that has an electrooptic effect, an optical guide and an electrode for modulation that are formed on said base plate, which has ridge structure, an anti-DC drift layer is installed on the surface of the above mentioned base plate where the optical guide is formed, and annealing treatment is performed after ridge processing.

8 Claims, 2 Drawing Sheets

LIGHT CONTROL ELEMENT

BACKGROUND OF THE INVENTION (1) Field of the Invention

The present invention relates to a light control element, in particular, to a light control element that equips a base plate having an electrooptic effect, with an optical guide and an electrode for modulation, and where ridge structure is formed on said base plate.

(2) Related Art Statement

In the technical fields of optical communication, optical measurement, etc., light control elements such as an optical switch, an optical phase modulator, and an optical intensity modulator are used frequently.

The light control element that can operate with low drive voltage at high speed is useful. Particularly, the light control element where an optical guide and an electrode for modulation are formed on a base plate having an electrooptic effect, such as $LiNbO_3$ (hereinafter described as LN) has been attracting attention.

For the light control element like this, it is necessary that the electric field generated by the electrode for modulation is impressed effectively to the optical guide, and for this purpose, the optical guide is formed on the ridge part or between the ridge on the base plate as in Japanese Patent No. 2550606 and Japanese Provisional Publication No. 2001-350050.

However, for the light control element using the base plate that has an electro optic effect, such as a LN optical modulator, the bias point of the modulation voltage that is impressed to said light control element deviates from the appropriate value gradually due to the direct current voltage impressed to said light control element, temperature change, and temporal change. This is called DC drift phenomenon. Particularly when an optical modulation reaches as much as 40 GHz, resulting from the progress of the broadband and high-speed optical communication in recent years, huge DC drift phenomenon occurs.

Further, the light control element with ridge structure tends to have the DC drift phenomenon, and it is essential to control this DC drift phenomenon for the purpose of drive stability of the light control element.

As a method for controlling DC drift phenomenon, Japanese Kokoku Publication No. 1993-78016 discloses the method of installing a conducting layer between electrodes. This method prevents the operation point of drive voltage from changing since the polarization inside a base plate changes due to the temperature change of the base plate.

Also, the prior application, Japanese Patent Application No. 2000-399927 (Provisional Publication No. 2002-202483), filed by the present applicant proposes the method of annealing a base plate in an oxygen-containing ambient atmosphere during the production process. This is to prevent DC drift phenomenon from occurring due to lack of oxygen inside the base plate resulting from overetching of a buffer layer.

However, the above-described methods for controlling the DC drift phenomenon cannot sufficiently control the DC drift phenomenon of the light control element having ridge structure, and particularly when the light control element is used in a large area, it has been a major problem.

The present invention intends to solve the above-mentioned problems, to control DC drift phenomenon of the light control element having ridge structure, and to provide the light control element which has high drive stability in a large area.

SUMMARY OF THE INVENTION

In order to solve the above-described objects, the invention related claim 1 is characterized in that a light control element being equipped with a base plate that has an electrooptic effect, an optical guide and an electrode for modulation that are formed on said base plate, which has ridge structure, comprises that an anti-DC drift layer is installed on the surface of the above mentioned base plate where the optical guide is formed, and annealing treatment is performed after ridge processing.

The invention related to claim 2 is characterized in that said anti-DC drift layer is formed by doping anti-drift materials from said base plate.

Further, the invention related to claim 3 is characterized in that said anti-drift materials consist of MgO or ZnO, the invention related to claim 4 in that the dope amount of said anti-drift materials accounts for 0.5~7 mole % of said base plate, and the invention related to claim 5 in that the thickness of said anti-DC drift layer is more than 0.5 $\mu$m from the surface toward inside of the base plate.

The applicants of the present invention found that the major cause of generating the DC drift phenomenon is that Li diffuses from LN base plate by dry etching in forming a ridge part on the base plate (Li deficiency) and accordingly surface resistance varies.

Moreover, as in the invention related to claim 1, it has been revealed that the Li poor part inside the base plate is recovered and DC drift phenomenon is improved by forming an anti-DC drift layer on the surface of the base plate and giving annealing treatment to the base plate after ridge processing.

As in claims 2 to 5, it has been revealed that it is the most effective when MgO or ZnO is selected as an anti-DC drift material and an anti-DC drift layer is formed by doping it into the base plate. Furthermore, MgO is especially effective in improving the surface resistance of base plate, and excellent in long-term stability against DC drift It is a condition for the anti-DC drift layer to be doped so that the surface concentration of the base plate may become 0.5~7 mole %. If it is 1~3 mole %, the most favorable result could be obtained. If it is less than 0.5 mole % the anti-DC drift effect gets little, and if it is more than 7 mole %, the base plate is devitrified by light scattering and propagation loss of the light that propagates the optical guide gets increased.

In addition, it is preferable that the thickness of the anti-DC drift layer is more than 0.5 $\mu$m from the surface toward inside of the base plate. If the thickness of the anti-DC drift layer is less than 0.5 $\mu$m, the anti-DC drift effect gets little.

DETAILED DESCRIPTION OF THE INVENTION

Figure 1:
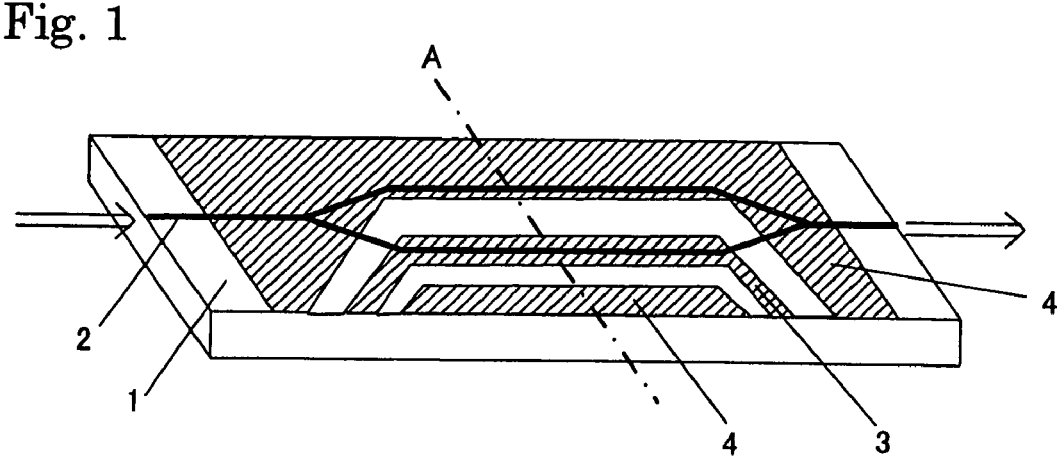
FIG. 1 is a schematic diagram of an optical modulator which is one example of the light control element of the present invention.

The favorable examples of the present invention will be explained hereinafter in detail.

It is preferable that the base plate comprising a light control element is comprised of lithium niobate ($LiNbO_3$; hereinafter described as LN), lithium tantalite ($LiTaO_3$), and PLZT (lead lanthanum zirconate titanate), particularly $LiNbO_3$ crystal, $LiTaO_3$ crystal, or a solid solution crystal consisting of $LiNbO_3$ and $LiTaO_3$ on the grounds that they are easy to be configured to be an optical guide device and that they have high anisotropy. The present embodiments will be explained mainly using lithium niobate (LN).

A light control element is produced as stated below.

Firstly, an optical guide is formed on the surface of a base plate by any methods, such as Ti thermal diffusion method, epitaxial grown method, and ion implantation. The line width of optical guide on the base plate is normally 0.3~10 $\mu$m, and the depth 2~10 $\mu$m.

Next, in order to reduce propagation loss of light in the optical guide, a buffer layer of dielectric $SiO_2$ etc. is formed on the base plate. The buffer layer can be formed from the existing materials, such as $SiO_2$, to have 0.2~2.0 $\mu$m in thickness by using the existing membrane making methods, such as a evaporation deposition, a sputtering method, an iron plating method, and a CVD method.

Then, an electrode for modulation consisting of a signal electrode and a ground electrode is formed to have 15~30 $\mu$m in thickness on the buffer layer by using the evaporation deposition, the plating method, or both of the methods, with materials with electro conductivity, such as Au.

In addition, there is another method of forming an electrode directly on the base plate without said buffer layer.

Several light control elements are formed into one base plate wafer and it is separated into each chip of an optical modulator in the last step. Thus, a light control element is produced.

A method for producing the light control element with ridge structure is conducted by incorporating a process of forming several grooves on the surface of the base plate in the production process of said light control element and accordingly, forming a ridge part sandwiched by the grooves. However, it depends on the positional relationship of the optical guide and the ridge part where the formation process of the ridge part is incorporated in the whole process. For example, when the optical guide is formed inside the ridge part, the formation process of the ridge part is conducted after forming the optical guide or the buffer layer. When the optical guide is formed between the ridge parts, the formation process of the ridge part is conducted before forming the optical guide.

There are some methods for forming the ridge part, such as a method using chemical reaction, such as wet or dry etching, and a method by mechanical cut like sand blasting, etc. Li deficiency, which is the object to be solved related to the present invention, is generated especially by dry etching.

Although there is plasma etching that uses activated radical generated during plasma arc, and reactive ion etching where sputtering effect is added to plasma etching, the ridge part is formed by means of non-reactive dry etching in the present invention. In particular, a chrome mask is formed to have 0.3~2.1 $\mu$m, for example, in thickness on the buffer layer or the base plate by evaporation deposition. After forming photoresist to have 0.7~1.0 $\mu$m in thickness, said photoresist is given patterning by means of photolithography. Then, the groove that accords with the ridge part of said chrome mask is removed by means of chemical etching, and the remaining is removed by organic' solvent.

Subsequently, the base plate having said chrome mask is set inside, for example, a dry etching apparatus having ECR plasma source, and the groove part that accords with the ridge part is given dry etching until 1~20 $\mu$m in depth. The remaining chrome mask is removed by chemical etching, etc.

Etching gas that can be used to non-reactive dry etching is not particularly limited as long as it forms non-reactive plasma ion species. However, it is preferable to use non-activated gas on the grounds that it has comparatively high etching rate and it is chemically stable and easy to be handled, in particular, it is preferable to use argon gas on the grounds that is it is easy to be obtained and cheap, and control of etching rate is simple.

As one of the features related to the present invention, doping MgO or ZnO on the surface of the base plate forms an anti-DC drift layer.

The formation stage of the anti-DC drift layer can be incorporated at any time before forming a buffer layer or an electrode for modulation in the production process of the light control element. For example, it is possible to form the anti-DC drift layer before and after the formation of an optical guide or the ridge part.

As the method for doping MgO or ZnO which is anti-DC drift material, any methods, such as a thermal diffusion method, a proton exchange method, an epitaxial grown method, and an ion implantation, can be used.

It is a condition for the anti-DC drift layer to be doped so that the surface concentration of the base plate may become 0.5~7 mole %. If it is 1~3 mole %, the most favorable result could be obtained. If it is less than 0.5 mole %, the anti-DC drift effect gets little, and if it is more than 7 mole %, the base plate is devitrified by light scattering and propagation loss of the light that propagates the optical guide gets increased.

In addition, it is preferable that the thickness of anti-DC drift layer is more than 0.5 $\mu$m from the surface of the base plate to the inside of the base plate. If it is less than 0.5 $\mu$m, the anti-DC drift effect gets little.

As another of the features related to the present invention, said base plate is given annealing treatment after forming a ridge part on the base plate by dry etching. In particular, by setting the base plate inside an electric furnace such as a tubular furnace, MgO is given heat treatment at 950~1100° C., and ZnO at 500~800° C., for 5~12 hours respectively. As the condition of annealing treatment, more favorable temperature of treatment is 980~1030° C. for MgO and 600~700° C. for ZnO, and more favorable time amount of treatment is 8~10 hours. Due to this annealing treatment, Li poor part is recovered to some extent, and accordingly, control of generation of DC drift phenomenon is made possible. Combined with the above-mentioned anti-DC drift layer, superior anti-DC drift effect could be archived.

If the heating temperature in annealing treatment is lower than 950° C. for MgO, 500° C. for ZnO, Li deficiency cannot be recovered sufficiently, and if it exceeds 1100° C., out-diffusion of Li is generated from the base plate, and this is not desirable.

In addition, if the heating time is less than 5 hours, Li deficiency cannot be recovered sufficiently, and if it exceeds 12 hours, the form of optical guide is deformed and propagation loss of light is increased due to the diffusion of Ti that forms the optical guide, and an anti-DC drift effect is decreased due to an out-diffusion of MgO or ZnO which is an anti-DC drift material and an out-diffusion of Li from the base plate.

The present invention will be explained in the concrete with embodiments in the following.

(Embodiments)

Figure 2:
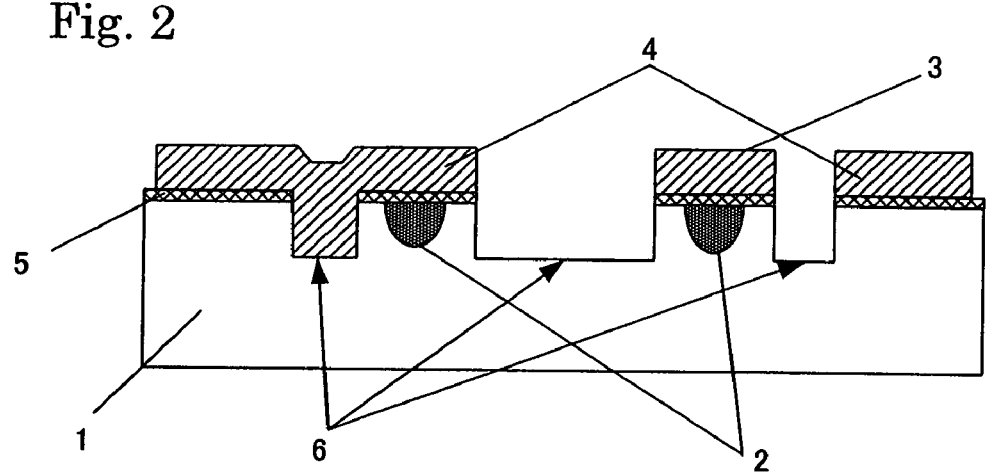
FIG. 2 is a sectional view of the chain line A of FIG. 1.

In the embodiments, a Mach-Zehnder type optical modulator was formed as in FIG. 1, based on said method for producing a light control element. FIG. 2 shows a sectional view of the optical modulator of FIG. 1 that is cut off along chain line A.

LN base plate with Z-cut (it has the highest electrooptic effect against the electric field in the vertical direction to the surface of the base plate) was used as a base plate.

Figure 3:
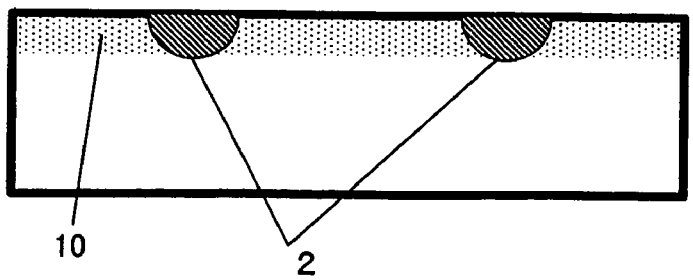
FIG. 3 is a diagram showing the doping condition of anti-DC drift materials of the present invention.

By covering the surface of base plate with MgO and giving heat treatment at 1000° C. for five hours, Mg was diffused into the base plate by annealing and Mg doping layer 10 was formed. Then, light guide 2 which has 7 μm in line width and 5 μm in depth was formed in said base plate by Ti thermal diffusion method (Ref. FIG. 3).

Moreover, buffer layer 5 consisting of $SiO_2$ is formed on the base plate to have 0.5 μm in thickness by evaporation deposition.

Then, by using argon gas as etching gas with using a dry etching apparatus that is equipped with ECR plasma source, groove part 6 that has 3 μm in depth and accords with a ridge part was formed.

Said base plate 1 was set inside an electric furnace and given annealing treatment of 9 hours heating time at 1000° C. heating temperature.

After forming Ti layer and Au layer as a ground layer on the buffer layer by evaporation deposition, thick Au layer was formed as an electrode layer by plating method. Furthermore, by giving chemical etching to said Ti layer and Au layer and accordingly separating them, signal electrode 3 and ground electrode 4 were formed to have 20 μm in thickness.

As a method for measuring the DC drift amount, an optical fiber was connected to said optical modulator, and laser beam (wave length: 1550 nm) was inputted to said optical modulator. With inputting a modulating signal of 40 GHz and impressing given DC bias voltage to the signal electrode, outgoing beam from said optical modulator was observed by using a power meter.

Operating test was conducted at constantly 85° C. for 24 hours to said optical modulator. During the time, DC bias voltage was adjusted so that the outgoing beam from the optical modulator might become the optimum modulation condition, and said adjustment amount of DC bias voltage was checked as the DC drift amount.

Figure 4:
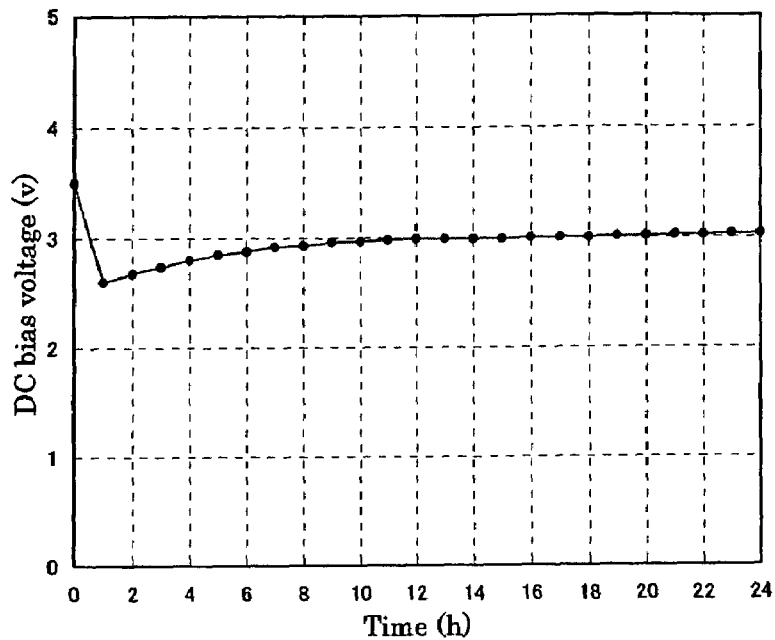
FIG. 4 is a graph showing the DC drift amount of the embodiments.

The graph of the measurement results is shown in FIG. 4.

COMPARATIVE EXAMPLES

Figure 5:
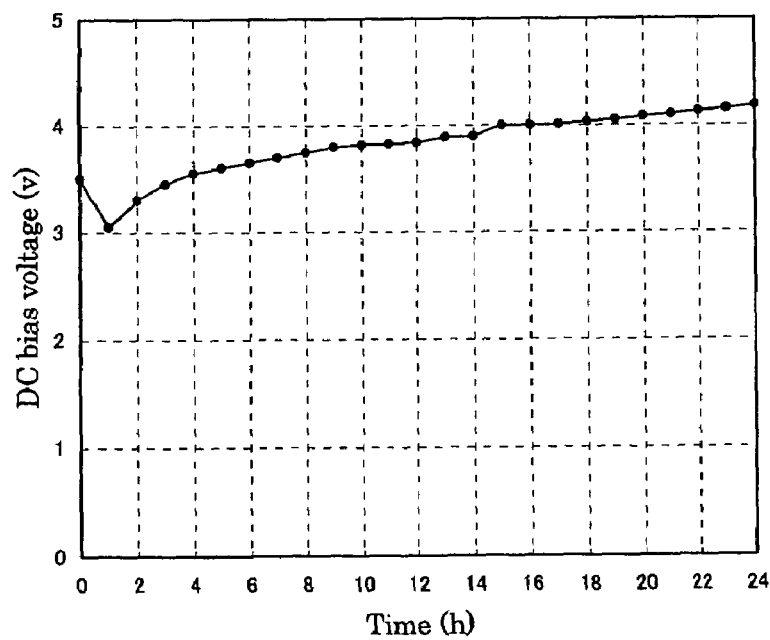
FIG. 5 is a graph showing the DC drift amount of the comparative examples.

Optical modulators were made under the same conditions except MgO doping and annealing treatment as those of said embodiment and the DC drift amounts were measured under the conditions as described in the embodiments. The graph of the results is shown in FIG. 5.

When comparing the change of DC drift amount of the embodiments with that of the comparative examples, the DC drift amount after 24 hours is 0.5 v in the embodiments, while it is 1.2 v in the comparative examples. In particular, in the present embodiments, little DC drift was generated after 8 hours from the drive and this proves that DC drift phenomenon is controlled effectively.

Also, it has been confirmed that doping ZnO instead of doping MgO controls DC drift phenomenon as effectively as MgO.

Further, the optical modulator having a ridge part was centrally explained in said embodiments etc., however, it has been also confirmed that the effect of DC drift control by doping MgO or ZnO related to the present invention is valid for light control elements such as an optical modulator that does not have a ridge part.

As described hereinabove, in accordance with the light control element of the present invention, it is made possible to control DC drift phenomenon in the light control element having ridge structure, and to provide the light control element that has high drive stability widely.

The invention claimed is:

1. A light control element equipped with a base plate that has an electrooptic effect, an optical guide and an electrode for modulation formed on said base plate, which has ridge structure, wherein:
   an anti-DC drift layer is formed on a surface of the base plate, where the optical guide is formed, by doping anti-drift materials from said base plate.

2. A light control element as claimed in claim 1, wherein: annealing treatment is performed after ridge processing.

3. A light control element as claimed in claim 1, wherein: said anti-drift materials consist of MgO or ZnO.

4. A light control element as claimed in claim 3, wherein: said anti-drift materials consist of MgO or ZnO; and a dope amount of said anti-drift materials accounts for 0.5~7 mole % of said base plate.

5. A light control element as claimed in claim 1, wherein: thickness of said anti-DC drift layer is more than 0.5 μm from the surface toward inside of the base plate.

6. A light control element as claimed in claim 2, wherein: thickness of said anti-DC drift layer is more than 0.5 μm from the surface toward inside of the base plate.

7. A light control element as claimed in claim 3, wherein: thickness of said and-DC drift layer is more than 0.5 μm from the surface toward inside of the base plate.

8. A light control element as claimed in claim 4, wherein: thickness of said anti-DC drift layer is more than 0.5 μm from the surface toward inside of the base plate.

* * * * *